United States Patent

Coffey et al.

[15] 3,644,149

[45] Feb. 22, 1972

[54] BATTERY TERMINAL CONSTRUCTION AND METHOD FOR FORMING BATTERY TERMINALS

[72] Inventors: James P. Coffey, Hatboro; Frank A. Vengrofski, Rockledge, both of Pa.

[73] Assignee: ESB Incorporated

[22] Filed: June 22, 1970

[21] Appl. No.: 47,989

[52] U.S. Cl. ........................... 136/135 S, 136/168, 136/170
[51] Int. Cl. ................................................... H01m 5/00
[58] Field of Search .................. 136/135, 134, 168, 166, 170, 136/176, 81

[56] References Cited

UNITED STATES PATENTS

| | | | |
|---|---|---|---|
| 1,284,424 | 11/1918 | Morrison | 136/81 |
| 1,284,746 | 11/1918 | Morrison | 136/81 |
| 1,367,593 | 2/1921 | Ford | 136/168 X |
| 1,401,573 | 12/1921 | Wood | 136/168 |
| 3,285,785 | 11/1966 | Shannon | 136/168 |
| 3,303,056 | 2/1967 | Sabatino et al. | 136/135 S |

*Primary Examiner*—Anthony Skapars
*Attorney*—Alfred J. Snyder, Jr., Robert H. Ribinson, Raymond L. Balfour and Anthony J. Rossi

[57] ABSTRACT

Batteries are described having battery posts disposed wholly within the battery container. Terminal inserts are installed through the walls of the battery container and into the posts within by a method combining high-speed rotation and pressure. The terminal inserts make permanent electrical and mechanical contact with the interior battery posts and provide external electrical contact means. Means are described to lock the wall of the container to the post and insert and provide a liquidtight seal therebetween.

18 Claims, 9 Drawing Figures

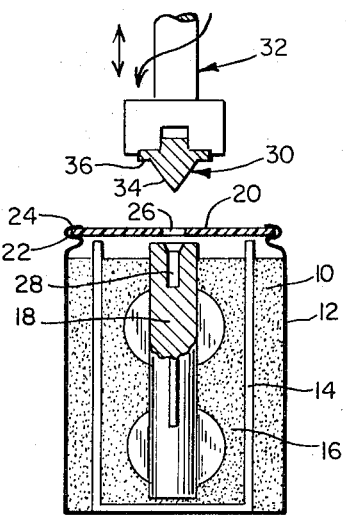
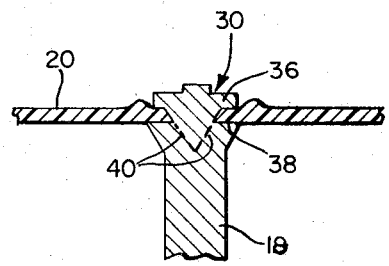
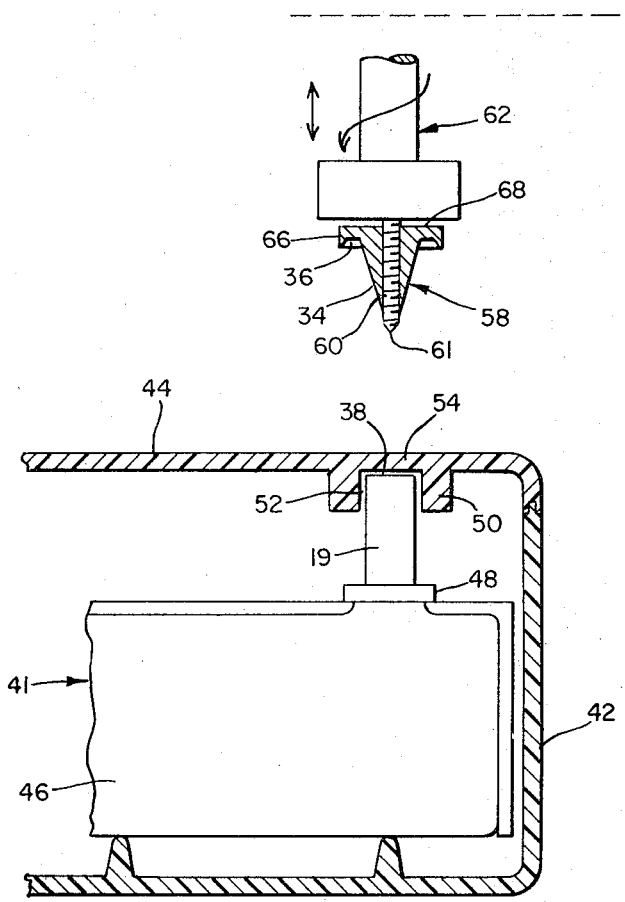
Fig. 1
Fig. 2
Fig. 3
INVENTORS.
JAMES P. COFFEY
FRANK A. VENGROFSKI

INVENTORS.
JAMES P. COFFEY
FRANK A. VENGROFSKI

BATTERY TERMINAL CONSTRUCTION AND METHOD FOR FORMING BATTERY TERMINALS

BACKGROUND OF THE INVENTION

1. Field of the Invention

This invention relates to electrochemical batteries and more particularly to novel battery terminals and methods for applying such terminals to batteries. While not limited thereto, the invention will be described in terms of the lead-acid storage battery.

2. Description of the Prior Art

A conventional method to construct or form a storage battery terminal is to pour melted lead around a lead collar molded in the battery cover, and at the same time, by use of a torch, fuse the melted lead to the end of a battery terminal post protruding through a hole in the lead collar. In order to give the proper shape to the battery terminal, which is generally a circular conical frustum, an iron mold having a suitable cavity is placed on the battery cover surrounding the lead collar and terminal post prior to the terminal forming operation. Up to the present time, the formation of battery terminals has been a hand operation, for it has not been possible to adapt apparatus to perform this operation in a reliable way. With increased mechanization in other phases of storage battery manufacture, the manual operation of forming the battery terminals is an economic burden to the battery manufacturer and thus results in higher prices for purchasers of batteries, i.e., the public.

It may be explained that it is important that the battery terminals be sealed to the battery cover so that electrolyte will not leak out of the battery and cause corrosion damage. A great many types of seals have been proposed and used in conjunction with battery terminals. The most successful types make use of additional parts such as glands and gaskets or inserts molded in the cover in order to prevent leakage of electrolyte. These additional parts also increase the cost of battery manufacture.

SUMMARY OF THE INVENTION

Briefly, and in accordance with the invention, a battery is partially constructed with one or more of the battery terminal posts terminating at the inside surface of one of the walls of the battery container, preferably at the underside of the battery cover. A terminal insert member is mounted on a rotatable tool and the insert is brought down into contact with the battery wall in axial alignment with the interiorly disposed battery terminal post. The tool and the terminal insert member are rotated and a portion of the insert is forced through the battery wall into engagement with the terminal post. The frictional heat developed is sufficient to fuse the terminal insert member and terminal post together as well as soften the battery wall material. At the completion of the operation, and when the parts have cooled, the terminal insert member and terminal post are unified and the battery wall is securely locked between them to form a liquid tight seal.

BRIEF DESCRIPTION OF THE DRAWINGS

FIG. 1 shows a partial cross section of a cylindrical battery cell with a terminal insert according to the invention mounted in a tool for performing the method in accordance with the invention;

FIG. 2 shows a cross section of a completed terminal construction of FIG. 1 in accordance with the invention;

FIG. 3 shows a partial cross section of a rectangular battery cell and a modified terminal insert mounted in a tool for performing the method which results in a second terminal construction in accordance with the invention;

DESCRIPTION OF THE PREFERRED EMBODIMENTS

Figure 4:
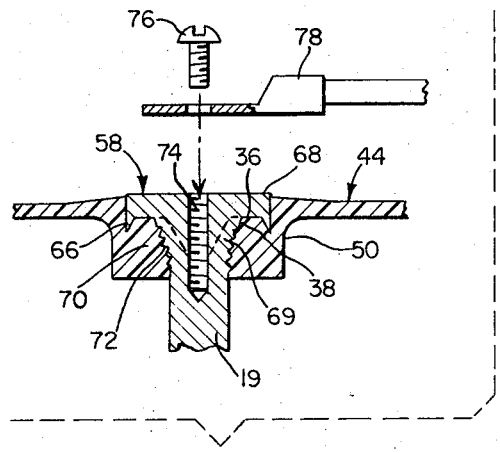
FIG. 4 shows a cross section of the second terminal construction in accordance with the invention.

Referring now to the drawings wherein like reference numbers are used throughout the several views to designate like parts, a partially completed cylindrical storage battery cell sectioned through a vertical plane is shown in FIG. 1. By way of example, this cell is shown with tubular lead sponge negative material 10 in contact with a metallic conductor and container 12. The negative active material encloses a cup-shaped separator member 14 made of a nonconductive porous material such as polypropylene felt. Within the cup 14 is located a porous mass of lead peroxide positive active material 16. The pores of separator 14, and active materials 10 and 16 contain electrolite such as sulfuric acid solution. A current collecting electrode 18 of lead alloy is centrally disposed in the inner active mass. This electrode abuts the underside of an insulating closure member 20. The closure member 20 is locked in liquid and gastight relationship to the metallic container 12 by means of bead 22 and flange 24, formed on the upper part of container 12. A hole 26 extends through the insulated closure 20 in alignment with the axis of electrode 18. A cavity 28 in the upper end of electrode 18 is aligned with hole 26. The hole 26 and cavity 28 may be provided in any suitable manner. For example, they may be drilled holes or they may be formed during molding operations. Although the hole 26 and cavity 28 in FIG. 1 are shown as cylindrical and rather small, they may be larger cylindrical holes, conical, or other desirable shape.

Positioned above hole 26, there is illustrated a metallic terminal insert 30 that is removably secured to a moveable rotatable fixture 32. A conical point or stem 34 forms a part of insert 30. This point is shown positioned in axial alignment with and directly over hole 26. To join the terminal insert 30 with electrode 18, insert 30 is rotated by fixture 32 and at the same time forced down into hole 26. The friction developed during this operation produces heat and softens the closure material so that it flows aside as the point 34 is pushed into it. The metal of electrode 18 is also heated and softened and flared at its end by the action of point 34. The insert 30 is forced down until the undersurface of a generally circular flange 36 provided on insert 30 is brought into intimate contact and embedded in the closure 20 and the two metallic parts are permanently united together. The fixture 32 is now stopped and disengaged from insert 30.

FIG. 2 illustrates a cross section of the completed terminal. It will be seen that closure 20 is somewhat deformed and firmly compressed and locked between the undersurface of flange 36 and the expanded top or end surface 38 of electrode 18.

The exact nature of the stresses imposed upon the cover material in the area of the seal due to its own shrinkage as it cools down from a near liquid state to a hard solid coupled with the shrinkage of the metal parts as they cool is difficult to determine. However, we find that as a result of the operation, the plastic part is firmly engaged and locked by the metal and sealed thereto.

By using the same metal for the terminal insert 30 as the metal used in the electrode 18, the joint between the two shown by the dotted line 40 can become an actual metallic weld. Metallurgical studies of battery terminals so constructed have confirmed the metallic welding of the insert point 34 and the electrode 18.

It may be pointed out here that it is not essential to provide the hole 26 and the cavity 28 in the post 18 prior to the forcing of the insert 30 into the post as described. A cover free of any openings may be provided on the container, and the insert can be forced through the cover and into embedding relation with a terminal post as will be described hereinafter.

With reference now to FIG. 3, a partial cross section of a conventional lead-acid automobile cranking battery is shown. A battery element 41 is enclosed by a container 42. A cover 44 of conventional hard rubber or plastic material is shown cemented or otherwise secured in any suitable fashion to the top of the container 42. The battery element 41 is comprised of positive plates, negative plates and separators therebetween.

The plates comprise a metallic grid structure (not shown) into the interstices of which an active material or active mass (not shown) of lead containing compounds is applied. This construction is well known in the storage battery trade and needs no description. In the completed battery, electrolyte will fill the cell compartment to a height above the cell element. The plates of each polarity are permanently fastened together by straps. In FIG. 3, the plates indicated by 46 are connected together by strap 48. A metallic cylindrical post 19 extends upwardly from the strap to the underside of cover 44. The plate, grids, strap and post form the current collecting electrode in this style of battery. In the design shown in FIG. 3, the underside of cover 44 has been reinforced by an integrally formed projection 50 facing the inside of the container to give added thickness thereto.

The projection 50 is provided with a socket 52 therein. It will be noted that the hole 26 shown in FIG. 1 is not provided in the cover 44, but rather, the cover 44 includes a web of material 54 which closes the socket 52. This web 54 serves a useful purpose. By forming the cover 44 with the web 54 across a place where there would otherwise be a hole, an incipient form of defect known as a "knit line" in the molded cover is prevented. Knit lines generally appear in injection molded parts where a hole is molded through the part and they can become a source of later weakness in the part. Further, the web also enables the battery manufacturer to test the cover seal for leaks prior to completion of the battery.

The metallic post 19 is shown received in the socket 52. Positioned above web 54, there is illustrated a modified form of a metallic terminal insert 58 having an axial opening 60 therethrough. The terminal insert is removably secured and mounted on a combined drill and tap tool 62. The terminal insert 58 has a flange 36 which is provided with a sharp-edged collar 66 at the rim. It also has a conical or stem portion 34 concentric with the axis of tool 62. The upper surface 68 of insert 58 is shown flat to provide an external electrical contact surface.

It is to be particularly noted that the sharp-edged collar 66 provided on the flange 36 faces in the same direction (downward in FIG. 3) as the point, or smallest end, of the conical portion 34 of insert 58 and the collar is concentric with the cone.

To join the terminal insert 58 with post 19, insert 58 is rotated by tool 62 and at the same time forced down into contact and through web 54. In this embodiment, insert 58 is forced downwardly until the underside of flange 36 engages the top or end surface 38 of post 19 as is illustrated in FIG. 4.

The point 61 of FIG. 3 of drill and tap tool 62 actually initiates the opening in web 54 and the cavity in post 19.

The introduction of the conical shaped projection 34 into the end of post 19 enlarges or flares the end of post 19 as shown at 69 FIG. 4. Cover material 70 is thereby engaged, locked and radially compressed between collar 66 and the expanded portion 69 of post 19. Cylindrical or spiral projections 72 may be formed on the outside of post 19 improving the grip between post 19 and projection 50. The projection 50 also assures that adequate thickness of cover material is present in the finished battery. If desired, a sealing material can be placed in the interface of post and cover such as by loading the socket 52 or coating the end of post 19 prior to the attachment of the cover 44 to the battery container. Depending upon the nature of the material of cover 44 and post 19, this sealing material may in face be required to give a good and reliable liquidtight seal. Where the cover material is polypropylene and the post material is an antimony-lead alloy, an acidproof, three component, hot melt compound has been found very effective in obtaining a permanent acidproof seal as well as providing a flux for the weld between post and insert.

A preferred hot melt sealing material comprises a first ingredient which is a resinous acid suitable for fluxing with the lead alloys of the insert and post and thus promoting the formation of a ture weld between these two parts. The second ingredient is a wax suitable for plasticizing the material of the container and thus promoting adhesion between the metal and the container material. The third ingredient is added to control the viscosity of the mix over the temperature range to which the battery will be subjected. A typical mix is equal parts by weight of natural rosin, an aliphatic hydrocarbon wax (such as paraffin wax) and ethylene isobutyl acrylate copolymer.

To provide for the attachment of a conductor to the contact surface 68, FIG. 4, a threaded hole 74 is formed in the insert 58 and post 19 by by the action of the tool 62, FIG. 3. A screw, FIG. 4, and conductor lug 78 are shown above the hole 74 and terminal insert 58 ready for attachment thereto.

Figure 5:
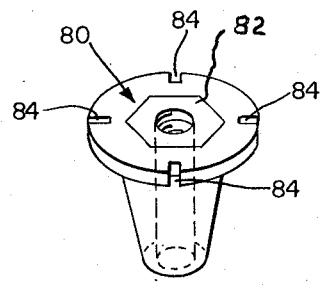
FIG. 5 shows a perspective view of another modified terminal insert.

Such a bushing is shown in FIG. 5, which also illustrates a third form of terminal insert according to the invention. The terminal insert is designated generally as 80 and is preferably comprised of a lead alloy. A lead plates, internally threaded brass bushing 82 is disposed in the axial opening of the insert 80. A series of slots, serrations or irregularities 84 are cut through the rim of insert 80. These irregularities fill with softened cover material at the time insert 80 is applied to the battery, and when the cover material resolidifies, the material in the slots locks the insert 80 against rotational movement.

Figure 6:
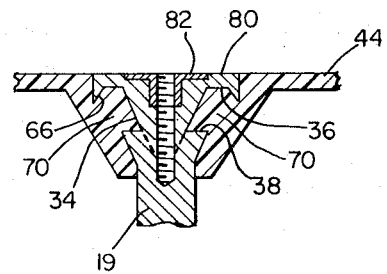
FIG. 6 shows a cross section of terminal construction embodying the insert shown in FIG. 5.

Still another form of the terminal insert of the invention is shown in FIG. 6. In this design, the web of container wall material is somewhat thicker than that shown at 54 in FIG. 3. When the insert 80 is brought down to the approximate level of cover 44, the bottom surface of flange 36 does not engage the top 38 of the post 19. In this case, the portion of the cover 44 shown as 70 is enclosed and locked by the metal collar 66 and conical portion 34, and axially between the underside 36 of the terminal insert 58 and the top 38 of post 19. Thus, this design combines the clamping features of both FIG. 2 and FIG. 4. Note that the insert 80 used in FIG. 6 includes the bushing shown in FIG. 5.

Figure 7:
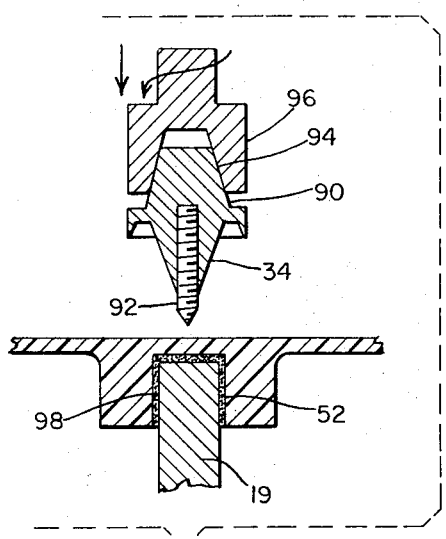
FIG. 7 shows a cross section of a terminal and terminal insert of a fourth modification with the insert mounted in a tool.
Figure 8:
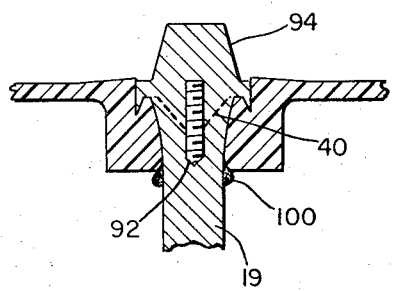
FIG. 8 shows a cross section of the completed terminal of the style shown in FIG. 7.

Still another embodiment of this invention is shown in FIG. 7. In this instance, the terminal insert shown as 90 and made of lead composition for use with a lead-acid-type battery is provided with a drill point 92 made of hard metal such as steel or hardened steel permanently embedded in the end of and on the axis of the conical portion 34. Insert 90 is shown with a tapered contact member 94 of frustum shape as found on many vehicle batteries. In this case, the application tool 96 meshes with the taper of the contact area 94. A layer of hot melt compound 98 is shown in socket 52 between post 19 and the cover material. A cross section of the completed terminal is shown in FIG. 8. In FIG. 8, the drill point 92 is shown on the axis of the terminal and post. The weld between the terminal insert 90 and the cell post 19 is indicated by the dotted line 40. A bead of hot melt compound is shown at 100 where it has been squeezed due to the enlarging of post 19.

Figure 9:
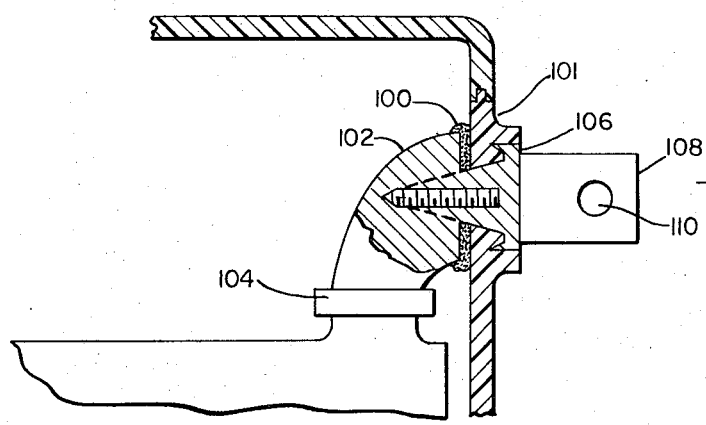
FIG. 9 shows a partial section of a battery in which a terminal insert is applied through the battery sidewall to form a battery terminal in accordance with the invention.

Although in the examples given so far reference has been made to the terminal insert passing through the cover of the battery, this invention applies equally as well to the sides, ends or bottom walls of the battery. FIG. 9 illustrates an example of a terminal insert passing through the sidewall of a battery container. In this figure, laterally extending battery post 102 has been added to the battery strap 104. Terminal insert 106 is shown forced through the battery container sidewall 101 into the post 102. In this example, a spade-type terminal connecting piece 108 with bolt hole 110 is shown. Hot melt compound sealing the metal to wall interface is shown at 100.

EXAMPLE

By way of example, a terminal insert tool similar to that shown in FIG. 3 as item 62 was mounted in a drill press and an insert similar to item 58 was placed thereon. A battery having a container made of polypropylene and a terminal design as shown in FIG. 3 was placed on the drill press with the center of the post directly over the point of the tool 62. Prior to assembly, the terminal post was dipped in a hot melt compound made up from natural wood rosin 1 part by weight, paraffin wax 1 part by weight and ethylene isobutyl acetate copolymer 1 part by weight. The tool was rotated at a speed of approximately 5,000 r.p.m. and a downward pressure of approximately 1,500 pounds was applied to the tool. After approximately 12 seconds, the insert had imbedded itself till the top surface was flush with the battery cover.

From this example it can be seen that the forces required to make a reliable connection between terminal insert and post and at the same time a reliable seal with the container wall can be of a considerable magnitude. Therefore, the battery parts have to be designed to provide sufficient support to the post members and the parts such as straps to which the posts are connected. Ways of providing this support are not considered to be part of this invention.

Having thus described our invention, we claim:

1. In an electrical battery having a container, a cell element within the container, the cell element comprising positive active material, negative active material, separation means between the positive and negative active materials, at least one metallic current collector disposed in at least one of said active materials and at least a portion of the container wall made of a thermally deformable material, the improvement comprising:
   a. a metallic terminal insert defining a terminal for the battery, the terminal insert having a stem portion passing through the thermally deformable portion of the container wall material and being embedded in the current collector within the confines of the battery container; and
   b. the container wall material through which the insert passes being locked between portions of the insert and portions of the current collecting electrode.

2. In a storage battery having a container of thermally deformable material with at least one cell compartment therein, a cell element comprising positive plates and negative plates, a positive strap connecting the positive plates together and a negative strap connecting the negative plates together, the container having four sidewalls, a bottom wall and a cover wall, and at least one metallic terminal post therewithin attached to one of the straps and abutting at one of the container walls, the improvement comprising:
   a. a metallic terminal insert defining a terminal for the battery, the terminal insert having a flange portion and a stem portion, the stem portion passing through one of the battery walls and being embedded in the terminal post; and
   b. the container wall through which the insert passes being locked between the insert and the terminal post.

3. A battery as defined in claim 2 in which the flange on the insert has a collar projecting from its underside penetrating into the container wall.

4. A battery as defined in claim 2 wherein the stem portion of the insert is a conical frustum in configuration and the terminal post has a cylindrical portion and a flared end portion, said stem portion of the insert being partially embedded in the end of said post, and the diameter of the flared end surface of the terminal post being greater than the diameter of the portion of the conical frustum embedded in the end of the terminal post.

5. A battery as defined in claim 2 in which a sealing material is located in the interface defined by the battery container wall and the terminal post.

6. A battery as defined in claim 2 further characterized by a socket formed on the inside of a container wall and enclosing a portion of the terminal post.

7. A battery as defined in claim 6 in which a sealing material is located in the interface defined by the socket on the inside of the container wall and the metallic terminal post.

8. A battery as defined in claim 6 in which the terminal post has circumferential projections in the area adjacent to its upper end.

9. In a lead acid storage battery having a container with a plurality of cell compartments, a cover sealed to the container and closing the cell compartments, a cell element in each cell compartment comprising positive plates, negative plates, separators therebetween, positive straps connecting the positive plates in each cell compartment and at least one terminal post disposed within the container adjacent the cover and attached to one cell element, the improvement comprising:
   a metallic terminal insert passing through the container cover and engaged in permanent mechanical and electrical contact with the terminal post within the container, the insert further characterized by having an electrical contact surface beyond the confines of the container and having a metallic externally threaded member embedded partially within the metallic insert and partially within the terminal post, the axis of the threaded member being on the axis of the metallic insert.

10. A method for applying a battery terminal to batteries of the type having a container, a cell element within the container, the cell element comprising positive active material, negative active material, separation means between positive and negative active materials, at least one metallic current collector disposed in at least one of said active materials and at least a portion of the container wall adjacent the current collector made of a thermally deformable material which comprises:
    a. mounting a metallic insert having point means on a moveable rotatable tool in axial alignment with the current collector; and
    b. rotating the tool with insert there mounted and forcing the point means of the insert through the thermally deformable container wall into embedment with the current collector.

11. A method as defined in claim 10 in which the insert is forced into the metallic current collector until the container wall is locked by the insert and terminal post.

12. A method for applying a battery terminal to batteries of the type having a battery container of thermally deformable material comprising two sidewalls, two end walls, a top wall and a bottom wall, a lead composition terminal post within the container extending to the inside surface of one wall, which comprises:
    a. mounting a lead composition insert having a stem portion thereon on a moveable and rotatable tool in axial alignment with the terminal post; and
    b. uniting the terminal post and the terminal insert and locking the container wall therebetween by rotating the tool with insert mounted thereon and forcing the stem portion of the insert through the container wall and into the terminal post.

13. A method as defined in claim 12 in which a hot melt sealing material is disposed in the interface formed by the lead composition terminal post and the adjacent container wall.

14. A method as defined in claim 12 in which the stem portion of the insert includes a drill member of hard metal protruding from the end and on the axis thereof.

15. A method for applying a battery terminal to batteries of the type having a polypropylene battery container comprising two sidewalls, two end walls, a top wall and a bottom wall, a socket formed on one inner wall of the container, and a lead composition terminal post having one end located in the socket which comprises:
    a. mounting a lead composition insert having a stem portion with a hard metal drill point protruding from the axis thereof to a moveable rotatable tool in axial alignment with the terminal post;

b. rotating the tool and insert at a speed of approximately 5,000 r.p.m.; and c. with a force of approximately 1,500 pounds forcing the stem portion of the insert with drill point attached through the wall of the container and into welding engagement with the terminal post.

16. A method as defined in claim 15 in which the insert includes a flange, a sharp-edged collar formed at the rim of the flange, the sharp-edged collar facing in the same direction as the stem portion; and in which the forcing of the insert into the container wall and terminal post is continued until the sharp-edged collar is at least partially embedded in the container material.

17. A method as defined in claim 15 in which the terminal post is caused to expand by its engagement with the stem portion of the insert until it engages the surface of the socket formed on the inner wall of the container.

18. A method as defined in claim 15 in which a hot melt sealing material is disposed in the interface fixed by the lead composition terminal post and the surface of the socket formed on the inner wall of the container.

* * * * *